Nov. 14, 1933.　　　　E. M. HOOVER　　　　1,935,319
CLAY PRODUCTS PROCESSING MACHINE
Filed Jan. 22, 1931　　3 Sheets-Sheet 1
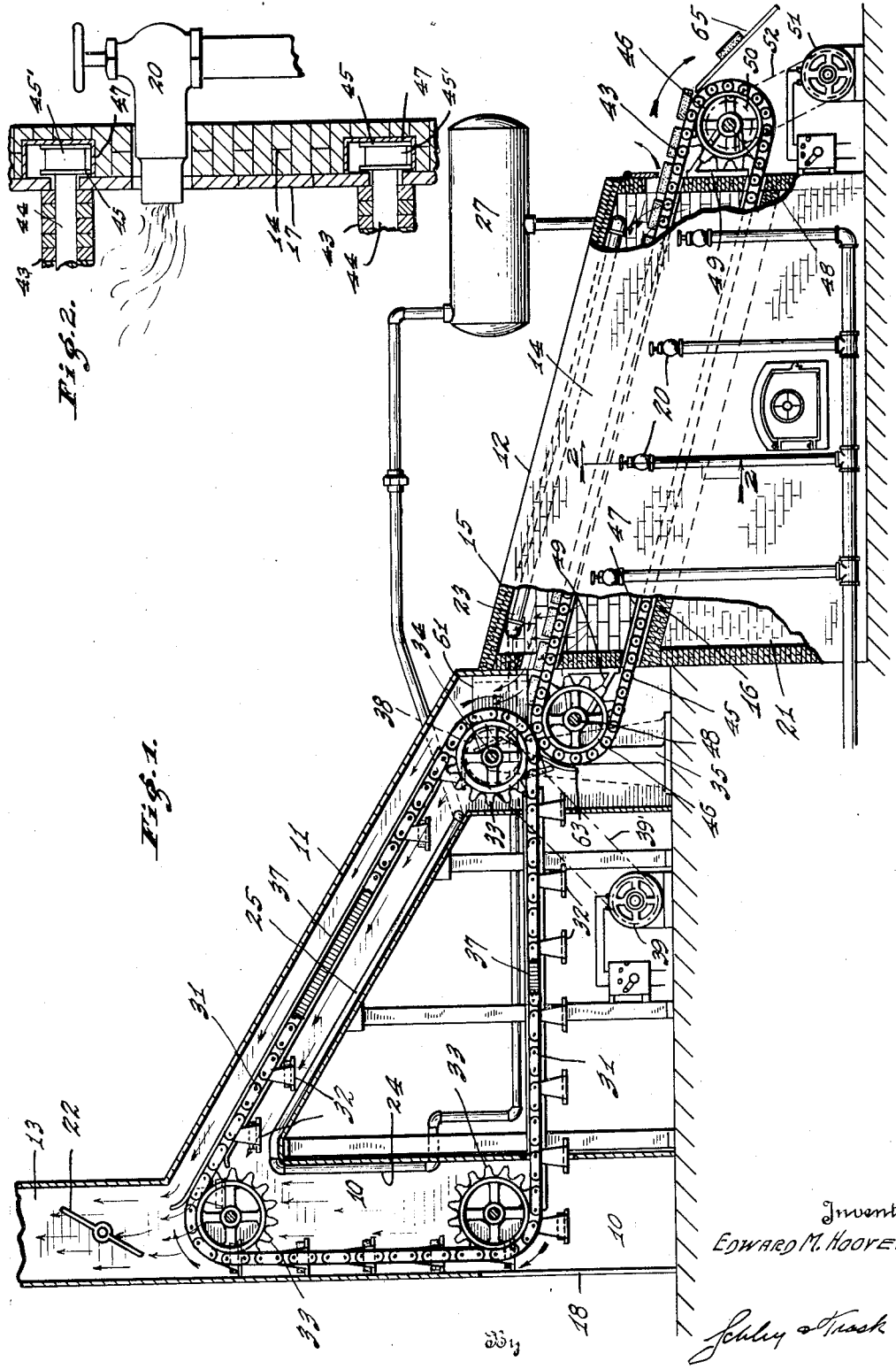

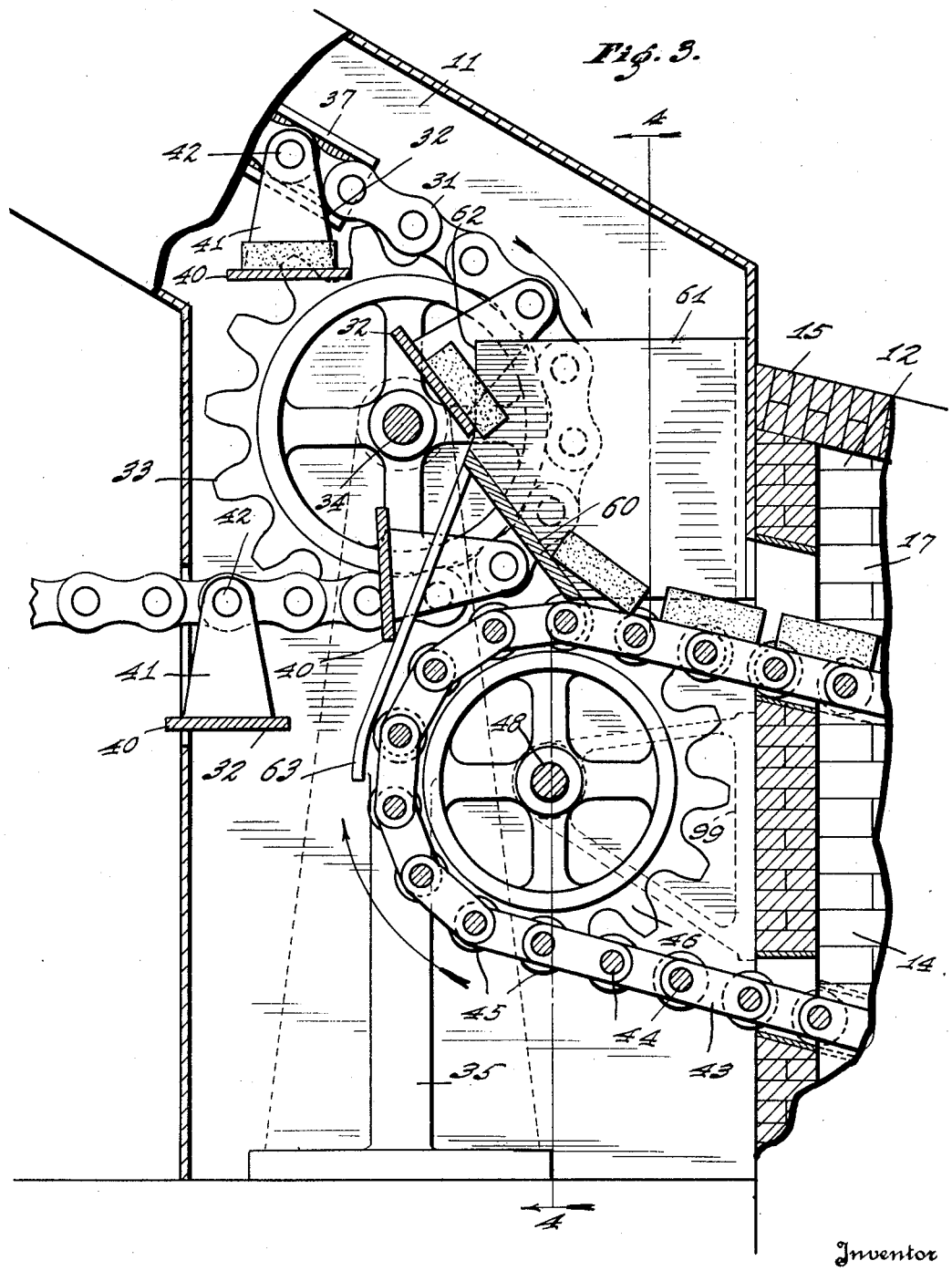

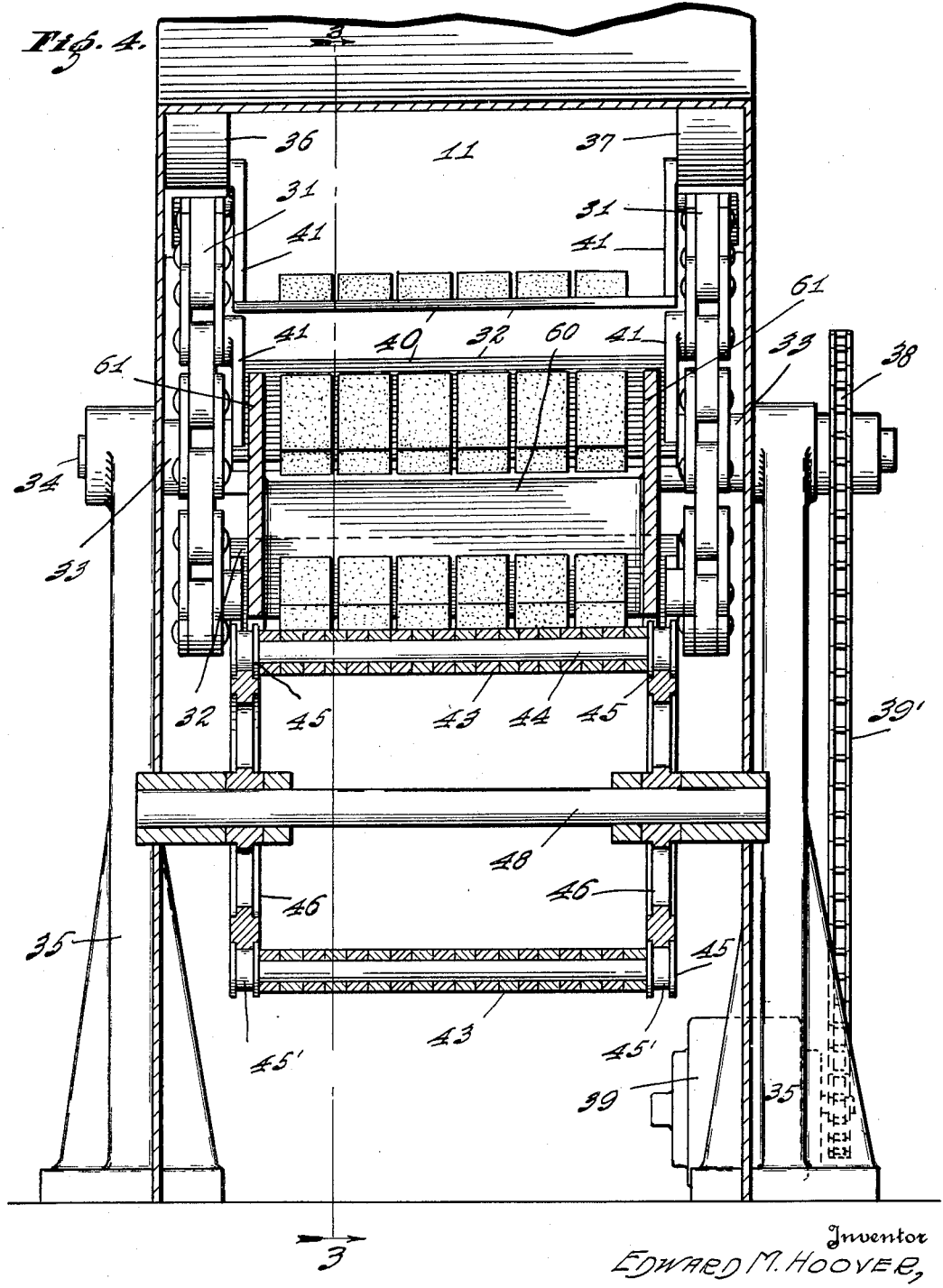

Patented Nov. 14, 1933

1,935,319

UNITED STATES PATENT OFFICE 1,935,319

CLAY PRODUCTS PROCESSING MACHINE

Edward M. Hoover, Anderson, Ind.

Application January 22, 1931. Serial No. 510,345

13 Claims. (Cl. 25—142)

My invention relates to clay-products processing apparatus for drying, and/or pre-heating, and burning or baking clay products such as bricks and ceramic products.

While I am describing my invention as a brick processing machine, it may be used for processing other clay products, as for instance, tile and the like.

It is the object of my invention to provide apparatus in which clay products will be dried, and/or pre-heated, and burned; and through which such products will travel automatically and continuously. It is the further object of my invention to utilize heat from the burning-kiln to dry and/or pre-heat the products before they enter such burning-kiln.

In accomplishing the objects of my invention I utilize heat from the burning-kiln by making such kiln in the form of an inclined tunnel through which products being burned are carried from the upper to the lower end on a heat-resisting conveyor, and associating with the upper or feed end of that tunnel a drying and/or pre-heating kiln having an inclined passage communicating at its lower end with the upper end of the burning kiln to receive exhaust heat and gases therefrom. The drying and/or pre-heating kiln is in a somewhat triangular form, the inclined passage forming one side thereof, the base of the triangle being the base of such kiln, and the other side being a passage similar to that forming the first mentioned side but being disposed vertically—although it need not be disposed vertically but may be inclined, or otherwise arranged. A conveyor travels through such two passages carrying bricks therethrough; and has associated with it at the end which communicates with the burning-kiln, means for transferring the bricks to the heat resisting conveyor of the burning-kiln.

I secure an additional utilization of heat from the burning kiln by associating therewith some heat exchange device, which conveys heat to the two passages of the pre-heating kiln, as for instance by means of steam.

The accompanying drawings illustrate my invention: Fig. 1 is a somewhat diagrammatic side elevation with parts broken away to show the arrangement of conveyors and other details; Fig. 2 is a vertical partial section showing details of one form of burning-kiln wall structure; Fig. 3 is a section on the line 3—3 of Fig. 4 showing the transfer mechanism between the two conveyors; and Fig. 4 is a section on the line 4—4 of Fig. 3.

For the pre-heating or drying kiln two tunnels or passages are provided by a suitable housing. One passage or riser 10 may be substantially vertical. The other passage or tunnel 11 is inclined, and communicates at its upper end with the upper end of the riser 10. The lower end of such tunnel 11 is adjacent and communicates with the upper end of an inclined burning-tunnel 12 which forms the burning kiln. At the upper end of the pre-heating tunnel 11 I provide a stack 13 for conveying away exhaust gases. The lower end of the riser 10 has an opening 18 for the introduction of material to be processed.

The burning-tunnel 12 desirably comprises side walls 14, a top wall 15, and a bottom wall 16 which are conveniently provided with a lining 17 of heat-resisting material, but they may be made entirely of heat-resisting material. The walls of the pre-heating passages, the riser 10 and tunnel 11, not being subjected to such high temperatures, are not shown as being made of heat-resisting material, although they may be so made.

Heat is conveniently supplied to the burning-kiln by a group of oil or gas burners 20 extending through the side walls 14 of the burning kiln 12, but such heat-supply may be augmented or replaced by a furnace 21 below such burning-tunnel. If such furnace 21 is used, the bottom wall 16 of the burning-tunnel may be dispensed with.

The pre-heating tunnel 11, because of its communication with the burning-tunnel 12 receives exhaust gases and heat therefrom and is heated by such heat. After passing through the pre-heating tunnel 11, the exhaust gases pass out the stack 13. In order to control the passage of gases through the stack 13, an adjustable damper 22 may be provided therein.

The heating of the pre-heating tunnel 11 is supplemented, and the riser 10 is supplied with heat by a heat exchange device associated therewith and with the burning-kiln 12 from which it absorbs heat. This heat exchange device may conveniently comprise a system of pipes 23 associated with the top wall 15 of the burning-tunnel 12; and pipes 24 and 25 associated with the riser 10 and the pre-heating tunnel 11 respectively. The pipes 24 and 25 communicate with the pipes 23 through a connecting pipe, and also with a condenser 27. The condenser 27 communicates also with the pipes 23 in the burning-kiln.

Circulation through this system is conveniently provided by convection, but a pump might be used to accelerate such circulation.

If water is the medium used in such heat exchange system, such water flows from the condenser 27 to the pipes 23 in the burning-kiln where it is changed to steam. Thence the steam flows to the pipes 24 in the riser 10 and to the pipe 25 in the pre-heating tunnel 11 where it gives up much of its heat to such riser and tunnel. From the tunnel the steam returns to the condenser and is changed to water and fed back over the same course.

For conveying material through the riser 10 and pre-heating tunnel 11 I employ a chain-supported basket-type continuous conveyor. Two chains 31 from which baskets 32 for carrying the clay-products are suspended are conveniently carried by three pairs of sprockets 33, one pair at the lower end of the riser 10, another at the juncture of the riser 10 and the pre-heating tunnel 11, and the third at the lower end of such preheating tunnel 11. The sprockets of each pair are spaced axially from each other, and are both integral with or non-rotatably secured on a shaft 34 journaled in standards 35 associated with the side walls of the pre-heater.

The chains 31 are also desirably guided through the pre-heating tunnel 11 by flanges 36 and 37 projecting inwardly from the walls of such tunnel above and below the chains.

The baskets 32 conveniently comprise a bottom in the form of a flat plate 40 on which the conveyed material will rest; and two end members 41 integral therewith, and provided with outwardly projecting stub shafts 42 by which the baskets are supported, and which also serve as link-pins for the links of the chain 31 through which they extend. The end-members 41 of the basket are considerably shorter than the radius of a sprocket 33 in order that the baskets may not strike the shaft 34 of such sprocket during their travel past such sprocket.

To provide a drive for the conveyor, the shaft 34 of the pair of sprockets at the lower end of the pre-heating tunnel may extend outwardly beyond one of its associated standards 35 and have secured to it a drive-sprocket 38. Any convenient source of power may be used; but desirably, and as I have shown it, the source of power is an electric motor 39 operatively connected to the drive-sprocket by means of a drive chain 39'.

While I have shown the riser as vertical and as having a single length of chain therethrough; the riser need not necessarily be vertical but can be inclined, and the chain may go through such riser more than once to provide a longer drying period.

For conveying material through the burning tunnel 12 I employ a continuous conveyor 43 of the chain type, made at least partly of material resistant to the intense heat—1,000° to 2,000° C.—in the burning tunnel. This continuous conveyor 43 may be of a chain-belt type, a plurality of links wide, having its several links adjacent each other and extending alternately between two of three link-pins 44 to form an almost continuous surface.

The conveyor 43 is desirably provided with rollers 45 loosely mounted on the ends of the link-pins 44 and such rollers may be spaced from the edge links as is shown in Fig. 2.

For mounting the conveyor 42 and guiding it through the burning-tunnel 12, I employ sprockets 46 over which the conveyor runs, and guide grooves or trackways 47 in the walls 14 of the tunnel 12 for receiving the rollers 45. The sprockets 45 are in pairs, one pair at each end of the burning kiln; and the sprockets of each pair are desirably fixedly mounted on a shaft 48 journaled in brackets 49 on the ends of the kiln 12, and are spaced from each other sufficiently to permit their teeth to co-operate with reduced portions 45' of the rollers 45.

The guide grooves or trackways 47 may be grooves of rectangular cross-section in the side walls 14 of the tunnel 11; and when such side walls are wholly constructed of heat-resisting material, the groove is entirely open at one side, and a conveyor is used which has its rollers 43 closely adjacent the conveyor links. If, however, such side walls 14 have a lining 17 of heat resisting material, such lining desirably extends across the opening of each groove from either side thereof to partially close that opening and thus protect the rollers from the heat of the kiln, while leaving open a slit wide enough to permit the passage therethrough of the portions of the link pins 44 between the rollers 45 and the edge links of that type conveyor which has its rollers 45 spaced from its edge-links.

For driving the conveyor 43 the shaft 48 at the lower end of the burning-tunnel 12 may be provided with a drive-sprocket 50 suitably driven as by means of an electric motor 51 and a drive chain 52.

In order to transfer the material being processed—the bricks as I am describing my device—from the baskets 32 of the conveyor in the pre-heating kiln to the conveyor 43 through the burning-tunnel 12, I employ means for tilting the baskets 32 when they reach the lower end of the pre-heating tunnel 11, and a slide 60 down which the bricks may slide on to the conveyor 42.

To this end, I secured two plates 61 to the end-wall of the pre-heating tunnel 11 in position to project toward the shaft 34 at the lower end of such tunnel, and to have their free edges 62 lying between the two sprockets 33 on such shaft and in the normal path of the baskets 32, where they will be struck by the ends of the front edges of the basket plate 40 just within the end members 41. The slide 60 may extend between the two plates 61 and be integral therewith to provide a brace between such two plates.

As I have shown it, the sprockets 46 for the burning-tunnel conveyor 43 are but slightly spaced from the sprockets 33 of the pre-heating conveyor; and I provide guide bars 63 having edges continuous with the free edges 62 of the plates 61 to carry the baskets 32 past the sprockets 46 and prevent such baskets from becoming fouled with the conveyor 43 on those sprockets.

For receiving the finished burned bricks from the lower or discharge end of the burning-tunnel conveyor 43, a suitable slide 65 may be associated with such discharge end.

When my apparatus is to be used, the burners 20 in the burning-tunnel are lighted to heat that tunnel and the pre-heating tunnel 11, part of the heat in such burning-tunnel being transferred by the pipes 23 to the pipes 24 and 25 in the riser 10 and pre-heating tunnel 11.

When the whole device has been heated to a sufficient extent, bricks or other clay products are introduced through the opening 18 in the riser on to the flat plates 40 of the conveyor through such riser. During the travel of these clay products on the conveyor through the riser 10, they may be dried and/or at least somewhat pre-heated. The conveyor then carries them into and through the pre-heating tunnel 11 where they may be further dried and are pre-heated to a much greater extent.

As each individual basket 32 reaches the lower end of the pre-heating tunnel 11, the forward edge of the flat bottom plate 40 of such basket strikes the free edges 62 of the plates 61; and as the conveyor chains 31 move on around the sprockets 33 the baskets are tilted until their bottom plates 40 stand at such steep angle that the bricks slide off. From the tilted baskets, the bricks fall on to the slide 60 and are carried by such slide on to the surface of the conveyor 43.

When they reach this point, the bricks are highly pre-heated, and are in condition for burning. As the conveyor 43 carries them on through the burning-tunnel 12, they are highly heated and burned; and are then discharged at the lower end of such tunnel on to the discharge slide 65.

In this continuous-process device the bricks may be received directly from the brick-forming machines, and may be dried and burned all in one continuous process; thus eliminating much handling of the bricks. When the clays used to make the bricks are of a type very hard to dry, the bricks may be given a preliminary drying in some well known manner; but I contemplate using my invention to perform all necessary operations on the bricks from the time they are formed until the time they are completely finished.

Further, by utilizing waste-heat from the burning-kiln for drying and/or pre-heating, I secure a material saving of heat.

I claim as my invention:

1. In combination, a burning-tunnel for the burning of clay-products, a pre-heating tunnel inclined upward away from said burning tunnel and adapted to receive exhaust heat and gases therefrom, a conveyor for moving clay-products through said pre-heating tunnel and having its carrying stretch substantially above the exhaust opening of said burning tunnel, a conveyor through said burning tunnel, and means for transferring said clay-products from said pre-heating tunnel conveyor to said burning-tunnel conveyor.

2. In combination, a burning-tunnel for the burning of clay-products, a pre-heating tunnel adapted to receive exhaust heat and gases therefrom, a moving-basket conveyor for moving clay-products through said pre-heating tunnel, a conveyor through said burning tunnel, and means for causing said baskets to tilt to discharge said clay-products on to said burning-tunnel conveyor.

3. In combination, a burning-tunnel for the burning of clay-products, a pre-heating tunnel adapted to receive exhaust heat and gases therefrom, a moving-basket conveyor for moving clay-products through said pre-heating tunnel, a conveyor through said burning tunnel, and an obstruction in the normal path of bottoms of said baskets for causing said baskets to tilt to discharge said clay-products on to said burning-tunnel conveyor.

4. A clay products-processing device, comprising a riser for drying, an inclined tunnel for pre-heating, and a burning-tunnel for burning clay-products; a moving-backet conveyor extending through said riser and said pre-heating tunnel, a conveyor through said burning tunnel, and means for transferring such products from said basket conveyor to said burning-tunnel conveyor.

5. A clay products-processing device, comprising a riser for drying, an inclined tunnel for pre-heating, and a burning-tunnel for burning clay-products; a moving-basket conveyor extending through said riser and said pre-heating tunnel, a conveyor through said burning tunnel, and means for transferring such products from said basket conveyor to said burning-tunnel conveyor, said pre-heating tunnel being arranged to receive exhaust heat and gases from said burning-tunnel.

6. A clay products-processing device, comprising a riser for drying, an inclined tunnel for pre-heating, and a burning-tunnel for burning clay-products; a moving-basket conveyor extending through said riser and said pre-heating tunnel, a conveyor through said burning tunnel, means for transferring such products from said basket conveyor to said burning-tunnel conveyor, and heat-exchange means for delivering heat from said burning-tunnel to said riser and said pre-heating tunnel.

7. A clay products-processing device, comprising a riser for drying, an inclined tunnel for pre-heating, and a burning-tunnel for burning clay-products; a moving-basket conveyor extending through said riser and said pre-heating tunnel, a conveyor through said burning tunnel, means for transferring such products from said basket conveyor to said burning-tunnel conveyor, and heat-exchange means for delivering heat from said burning-tunnel to said riser, said pre-heating tunnel being arranged to receive exhaust heat and gases from said burning-tunnel.

8. A clay products-processing device, comprising a riser for drying, an inclined tunnel for pre-heating, and a burning-tunnel for burning clay-products; a conveyor extending through said riser and said pre-heating tunnel, a conveyor through said burning tunnel, and means for transferring such products from said first-named conveyor to said burning-tunnel conveyor.

9. A clay products-processing device, comprising a riser for drying, an inclined tunnel for pre-heating, and a burning-tunnel for burning clay-products; a conveyor extending through said riser and said pre-heating tunnel, a conveyor through said burning tunnel, means for transferring such products from said first-named conveyor to said burning-tunnel conveyor, and heat-exchange means for delivering heat from said burning-tunnel to said riser and said pre-heating tunnel.

10. A clay products-processing device, comprising a riser for drying, an inclined tunnel for pre-heating, and a burning-tunnel for burning clay-products; a conveyor extending through said riser and said pre-heating tunnel, a conveyor through said burning tunnel, and means for transferring such products from said first-named conveyor to said burning-tunnel conveyor, said pre-heating tunnel being arranged to receive exhaust heat and gases from said burning-tunnel.

11. A clay products processing device, comprising a riser for drying, an inclined tunnel for pre-heating, and a burning tunnel for burning clay products, the preheating tunnel being in communication at its upper end with the riser and at its lower end with the burning tunnel to receive exhaust heat therefrom, and means for conveying material to be processed successively through the riser and the preheating and burning tunnels.

12. A clay products processing device, comprising an inclined tunnel for preheating, and a burning tunnel for burning clay products, the lower end of the preheating tunnel being in communication with the upper end of the burning tunnel and disposed substantially higher than the means providing communication, whereby it receives exhaust heat therefrom, and means for conveying material to be processed successively through the preheating and burning tunnels.

13. A clay products processing device, comprising a riser for drying, an inclined tunnel for preheating, and a burning tunnel for burning clay products, the preheating tunnel being in communication at its upper end with the riser and at its lower end with the burning tunnel to receive exhaust heat therefrom, heat exchange means arranged to absorb heat from the burning tunnel and deliver it to the riser, and means for conveying material to be processed successively through the riser and the preheating and burning tunnels.

EDWARD M. HOOVER.